United States Patent Office 3,492,361
Patented Jan. 27, 1970

3,492,361
NITROPOLYALKYLBIPHENYL PREPARATION
Imre Puskas and Ellis K. Fields, Chicago, Ill., assignors to Standard Oil Company, Chicago, Ill., a corporation of Indiana
No Drawing. Filed Mar. 28, 1967, Ser. No. 626,420
Int. Cl. C07c 79/10; A01n 9/20; C10l 1/22
U.S. Cl. 260—645                     10 Claims

ABSTRACT OF THE DISCLOSURE

The invention describes a process for the preparation of novel nitropolyalkylbiphenyls and dinitropolyalkylbiphenyls. The invention describes a process for preparing nitropolyalkylbiphenyls and dinitropolyalkybiphenyls wherein certain specified alkyl homologs of benzene or a mixture of two specified alkyl homologs of benzene is reacted with nitric acid at a temperature of about −40 to +30° C. The nitropolyalkylbiphenyls and dinitropolyalkylphenyls produced by the process are now compositions of matter and are useful as fungicides, insecticides, anti-knock agents and intermediates in the syntheses of antioxidants, drugs, agricultural chemicals and dyestuffs.

---

According to the process of this invention the novel nitropolyalkylbiphenyls and dinitropolyalkylbiphenyls are produced when nitric acid is added at a controlled temperature either to (1) an ortho dialkylbenzene or ortho trialkylbenzene, or to (2) a mixture of the ortho dialkylbenzene or ortho trialkylbenzene with a more basic polyalkylbenzene (from dialkylbenzene to pentaalkylbenzene inclusive). Both reactions comprise at least two separate reaction steps; oxidative coupling of the polyalkylbenzenes to polyalkylbiphenyls followed by nitration of the polyalkylbiphenyls. The oxidative coupling itself can take place between two identical alkylbenzene molecules referred to as homo-coupling reaction or between two different polyalkylbenzene molecules referred to as cross-coupling reaction. The homo-coupling reaction is illustrated below in general forms:

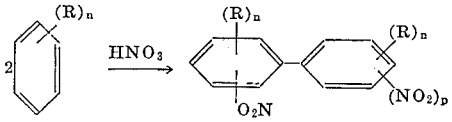

wherein R-s can be any alkyl group, wherein R-s occupy neighboring positions on the benzene ring. In the formula $n$ is integer from 2 to 3 and $p$ is an integer from 0 to 1. The cross-coupling reaction folows according to the following illustration:

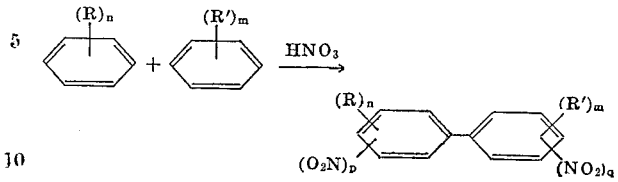

wherein R and R' can be any alkyl group, wherein R-s are located in ortho positions related to each other. In the formula $n$ is integer from 2 to 3 and $m$ is integer from 2 to 5 inclusive and $p$ is integer from 0 to 1 and $q$ is integer from 0 to 1 and $q$ is integer from 0 to 1.

The nitropolyalkylbiphenyls are produced only when the nitric acid is added to the hydrocarbon or hydrocarbon pair and not vice versa. The optimal reaction temperature for the production of nitropolyalkylbiphenyls ranges between about −35 to about +5° C. and varies with the reactants. The introduction of a second nitro group into the polyalkylbiphenyls takes place at higher temperatures under carefully controlled reaction temperatures. The best yields of nitro- (or dinitro-) polyalkylbiphenyls are obtained when methyl homologs of benzene are coupled.

According to the process of this invention usually several isomeric nitropolyalkylbiphenyls and dinitropolyalkylbiphenyls are produced simultaneously which cannot generally be obtained by any other synthetic routes. These now new nitro- and dinitropolyalkylbiphenyls are represented by the folowing generic formula:

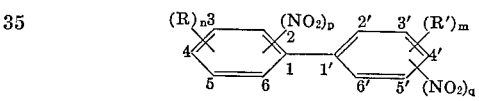

wherein R and R' can be any alkyl group, wherein R-s are located in ortho positions related to each other.

In the formula $n$ is integer from 2 to 3 and $m$ is integer from 2 to 5 inclusive and $p$ is integer from 0 to 1 and $q$ is integer from 0 to 1.

In Table I are listed the isolated new nitropolymethylbiphenyls and dinitropolymethylbiphenyls produced by the process of this invention. Their structures have been identified on the basis of elemental analyses, molecular weights (mass spectra), nuclear magnetic resonance, ultraviolet and infrared spectra.

TABLE I.—PHYSICAL CONSTANTS AND ELEMENTAL ANALYSES OF THE NEW NITRO- AND DINITRO-POLYMETHYLBIPHENYLS

| Number | Name of Compound | Melting Point, °C. | Empirical Formula | | Elemental Analyses | | |
|---|---|---|---|---|---|---|---|
| | | | | | Carbon | Hydrogen | Nitrogen |
| I | 2-nitro-3,3',4,4'-tetramethylbiphenyl | 99–100 | $C_{16}H_{17}NO_2$ | Calc | 75.29 | 6.66 | 5.49 |
| | | | | Found | 75.41 | 6.78 | 5.43 |
| II | 2,2'-dinitro-4,4',5,5'-tetramethylbiphenyl | 250–252 | $C_{16}H_{16}N_2O_4$ | Calc | 63.99 | 5.37 | 9.33 |
| | | | | Found | 63.74 | 5.65 | 9.18 |
| III | 2,3'-dinitro-4,4',5,5'-tetramethylbiphenyl | 173–174 | $C_{16}H_{16}N_2O_4$ | Calc | 63.99 | 5.37 | 9.33 |
| | | | | Found | 64.53 | 5.56 | 8.73 |
| IV | 2-nitro-2',3,3',4,4',5-hexamethylbiphenyl | 157 | $C_{18}H_{21}NO_2$ | Calc | 76.29 | 7.47 | 4.94 |
| | | | | Found | 76.39 | 7.40 | 5.36 |
| V | 2-nitro-3,3',4,4',5,5'-hexamethylbiphenyl | 168–169 | $C_{18}H_{21}NO_2$ | Calc | 76.29 | 7.47 | 4.94 |
| | | | | Found | 75.59 | 7.71 | 4.87 |
| VI | 2,2'-dinitro-3,3',4,4',5,5'-hexamethylbiphenyl | 280–282 | $C_{18}H_{20}N_2O_4$ | Calc | 65.84 | 6.14 | 8.53 |
| | | | | Found | 66.47 | 6.27 | 8.14 |
| VII | 2-nitro-2',3,4,4'-tetramethylbiphenyl | 94.0–94.7 | $C_{16}H_{17}NO_2$ | Calc | 75.29 | 6.66 | 5.49 |
| | | | | Found | 74.63 | 6.90 | 5.44 |
| VIII | 2-nitro-2',4,4',5-tetramethylbiphenyl | 74.5–76.0 | $C_{16}H_{17}NO_2$ | Calc | 75.29 | 6.66 | 5.49 |
| | | | | Found | 75.57 | 6.86 | 5.40 |
| IX | 2,3'-dinitro-4,4',5',6-tetramethylbiphenyl | 159–160 | $C_{16}H_{16}N_2O_4$ | Calc | 63.99 | 5.37 | 9.33 |
| | | | | Found | 63.70 | 5.30 | 9.13 |
| X | 2,2'-dinitro-4,4',5,6'-tetramethylbiphenyl | 130–131 | $C_{16}H_{16}N_2O_4$ | Calc | 63.99 | 5.37 | 9.33 |
| | | | | Found | 63.80 | 5.25 | 9.12 |
| XI | 3-nitro-2,3',4,4',6-pentamethylbiphenyl | 103.8–104.8 | $C_{17}H_{19}NO_2$ | Calc | 75.81 | 7.11 | 5.20 |
| | | | | Found | 75.82 | 7.10 | |

TABLE I—Continued

| Number | Name of Compound | Melting Point, °C. | Empirical Formula | Elemental Analyses | Carbon | Hydrogen | Nitrogen |
|---|---|---|---|---|---|---|---|
| XII | 2,3'-dinitro-2',3,4,4',6'-pentamethylbiphenyl | 160-161 | $C_{17}H_{18}N_2O_4$ | Calc | 64.96 | 5.77 | 8.91 |
|  |  |  |  | Found | 64.73 | 5.56 | 9.05 |
| XIII | 2-nitro-2',3',4,4',5-pentamethylbiphenyl | (a) | $C_{17}H_{19}NO_2$ |  |  |  |  |
| XIV | 2-nitro-2',3,4,4',5'-pentamethylbiphenyl | 114-116 | $C_{17}H_{19}NO_2$ | Calc | 75.81 | 7.11 | 5.20 |
|  |  |  |  | Found | 75.53 | 7.08 | 5.57 |
| XV | 2-nitro-2',4,4',5,5'-pentamethylbiphenyl | 119-120 | $C_{17}H_{19}NO_2$ | Calc | 75.81 | 7.11 | 5.20 |
|  |  |  |  | Found | 75.16 | 6.85 |  |
| XVI | 2-nitro-3,3',4,4',5,6-hexamethylbiphenyl or 2-nitro-2',3,3',4,4',5'-hexamethylbiphenyl | 151-152 | $C_{18}H_{21}NO_2$ | Calc | 76.29 | 7.47 | 4.94 |
|  |  |  |  | Found | 75.66 | 7.51 | 5.04 |
| XVII | 3-nitro-2,4,6-trimethyl-3',4'-diethylbiphenyl | Liquid | $C_{19}H_{23}NO_2$ | Calc | 76.73 | 7.80 | 4.71 |
|  |  |  |  | Found | 76.95 | 7.82 |  | a An eutectic mixture melting at 75-78° and containing approximately 77% of this compound was isolated which could not be purified further.

According to the preferred mode of operation a 3-necked flask equipped with a mechanical stirrer, a thermometer and a dropping funnel and containing either a single hydrocarbon (homo-coupling) or a hydrocarbon pair (cross coupling) is immersed into a thermostated cold bath and the content is cooled to the desired reaction temperature. Useful hydrocarbons for homo-coupling are o-xylene, hemimellitene, o-ethyltoluene, o-diethylbenzene, etc. Useful hydrocarbon pairs in the cross-coupling reaction are o-xylene-m-xylene, o-xylene-hemimellitene, o-xylenemesitylene, o-xylene-pseudocumene, o-xyleneprehnitene, o-xylene-isodurene and to lesser extent other hydrocarbon pairs (see Table II). In the cross-coupling reactions the mole ratio of the two hydrocarbons can vary from 0.5 to 2, the preferred ratio being 1:1 mole. Nitric acid is dropwise added to the stirred hydrocarbon or hydrocarbon pair. The concentration of the nitric acid used may be in the 80-100% range; 90% is the preferred acid concentration. The acid is used in excess, approximately three moles of acid being used for each mole of the hydrocarbons. Addition of the acid has different time requirements depending on the scale of the experiment and the efficiency of the cooling. After all the acid has been added the reaction mixture is stirred for an additional 30-60 minutes at the specified reaction temperatures. If mononitropolymethylbiphenyls are the desired reaction products then the reaction is quenched at this point by pouring the contents of the flask on a stirred mixture of ethanol free ether and ice. If the dinitropolymethylbiphenyls are the desired reaction products, the stirred reaction mixture is allowed to warm up very slowly by raising the temperature of the cooling bath. Caution must be exercised in this processing step so that the exothermic introduction of a second nitro-group remains under control. If the reaction is not sufficiently controlled oxidative chain reactions can be initiated which may adversely affect the process. In many cases addition of concentrated sulfuric acid might be advantageous for the introduction of the second nitro-group into the biphenyl. Usually when room temperature has been achieved and no more exothermic reaction is noticeable the formation of dinitropolymethylbiphenyls is complete. Then contents of the flask are poured on a stirred mixture of ethanol-free ether and ice.

Whether the reaction was carried to the mononitropolymethylbiphenyl stage or to the formation of dinitropolymethylbiphenyls, the organic materials are extracted into ether. The ether layer is washed with 10% sodium hydroxide solution and water, and dried with saturated sodium chloride solution. Removal of the ether in a Rotavapor gives the crude reaction mixture which is vacuum fractionated through a Vigreux column. The nitropolymethylphenyls distil without decomposition at 0.1 torr; the dinitropolymethylbiphenyls are most conveniently obtained from the residue. Since fractionation usually gives cuts containing more close boiling components, fractional crystallization is usually necessary to isolate the individual compounds in analytical purity.

TABLE II.—YIELDS OF NITROPOLYMETHYLBIPHENYLS FROM THE REACTION OF NITRIC ACID WITH MIXTURES OF METHYLBENZENES

| Hydrocarbon Pair (1:1 Molar Ratio) | Reaction Temp., °C. | Averaged Hydrocarbon Conversion, percent | Mole Percent Yield Homo Coupling a | Cross Coupling a |
|---|---|---|---|---|
| Toluene-mesitylene | 3±3 |  | None | None |
| o-Xylene-toluene b | 4±2 | 62 | 1.3 | 0.5 |
| o-Xylene-m-xylene | -13±2 | 53 | 5.9 (2) | 19.1 (3) |
| o-Xylene-p-xylene | -1±2 | 65 | 8.2 (2) | 3.8 (3) |
| o-Xylene-hemimellitene | -6±2 | 58 | c 8.0 (4) | 29.1 (3) |
| o-Xylene-pseudocumene | -7±1 | 61 | 1.7 (2) | 22.2 (3) |
| o-Xylene-mesitylene | -2±1 | 60 | 1.0 (2) | 25.4 (2) |
| o-Xylene-prehnitene | -13±1 | 63 | 0.9 (2) | 12.3 (1) |
| o-Xylene-isodurene | -6±1 | 53 | 2.0 (2) | 12.0 (2) |
| m-Xylene-p-xylene | 0±2 |  | None | None |
| m-Xylene-mesitylene | 3±2 |  | None | None |
| Hemimellitene-m-xylene | 2±3 | 72 | 5.4 (2) | 6.2 (1) |
| Hemimellitene-mesitylene | -13±1 | 55 | 6.5 (2) | 5.8 (2) |
| Hemimellitene-prehnitene | -6±2 | 57 | 5.1 (2) | 15.2 (1) | a Numbers in parentheses indicate the number of isomers.
b In this experiment the starting o-xylene:toluene molar ratio was 1:3.
c Nitrobixylyls (2 isomers), 1.9% and nitrobihemimellityls (2 isomers), 6.1%.

The following examples illustrate some embodiments of this invention. It will be understood that these are for illustrative purposes only and do not purport to be wholly definitive with respect to conditions and scope.

EXAMPLE I

A 1000 ml. 3-necked flask was equipped with mechanical stirrer, a thermometer and a dropping funnel. 216 g. of o-xylene (2 moles) were placed into the flask. The temperature of the o-xylene was taken down to —23° C. wtih a —40° C. bath cooled by De-50L Copelamatic F-12 refrigeration unit. With intensive stirring 280 ml. of 90% nitric acid was introduced dropwise from the separatory funnel, the exothermic reaction being controlled by the rate of the acid introduction. The temperature was maintained at —23±3° C. Addition of acid required 110 minutes; after being stirred an additional 60 minutes at —25° C. the reaction mixture was poured on a stirred mixture of ethanol-free ether and ice and extracted. The ether extract was washed with a 10% solution of sodium hydroxide and with water and dried with saturated sodium chloride solution. The ether was removed in a Rotavapor. The product mixture was distilled in high vacuo (0.3 mm.) to remove the unreacted o-xylene and the nitro-xylenes. The residue could be distilled at 0.3 mm. without decomposition and solidified in the cold in contact with methanol containing a small quantity of ether. The crystals were filtered and recrystallized from 700 ml. methanol after treatment with active carbon to give 32.1 g. of 2-nitro-3',4,4',5-tetramethylbiphenyl (XVIII) as yellowish prisms, M.P. 114.5–116° C. The mother liquors after reducing the volume of the solvent gave further less pure crops of XVIII and after fractional crystallization small amounts of 2-nitro-3,3′,4,4′-tetramethylbiphenyl (I; Table I). The optimal reaction temperature range for the preparation of 2-nitro-3′,4,4′,5-tetramethylbiphenyl (XVIII) was determined from temperature dependence studies, the results of which are shown in Table III. These data indicate that the highest yield of XVIII is obtained around −25° C.

TABLE III.—TEMPERATURE DEPENDENCE OF THE NITRATIVE COUPLING OF o-XYLENE

| Temperature (° C.): | Reaction Time (minutes) | Conversion | Mole percent Yield of XVIII |
|---|---|---|---|
| −25±1 | 125 | 52 | 38 |
| −10 | 45 | 57 | 23 |
| 0±2 | 40 | 60 | 23 |
| +20±2 | 30 | 79 | 7 |

EXAMPLE II

To one mole of o-xylene 141 ml. 90% nitric acid was introduced at −25° C. in 90 minutes as described in Example I. With continuous sitrring, the mixture was allowed to come to room temperature (24° C.) gradually in 90 minutes by regulating the temperature of the cooling bath. The temperature was kept at 25° C. for 30 minutes with the help of a cold water bath. Then the reaction was quenched and the mixture worked up as described. During the ether extraction crystals started to separate in the separatory funnel. After a few hours standing they were filtered and recrystallized from dimethylformamide to give pure 2,2′-dinitro-4,4′,5,5′-tetramethylbiphenyl (II, Table I) (2.7 g.).

The organic and aqueous layers were separated after removal of the crystals of 2,2′-dinitro-4,4′,5,5′-tetramethylbiphenyl. The ether layer was washed with 10% sodium hydroxide solution. During separation of the organic and aqueous layers, again crystals started to form in the separatory funnel. After several hours the crystals were filtered and recrystallized from dimethylsulfoxide to give pure 2,3′-dinitro-4,4′,5,5′-tetramethylbiphenyl (III, Table I) (3.8 g.).

The ether layer was washed with water and dried with saturated sodium chloride solution, ether was removed in a Rotavapor, and the residual product mixture was vacuum distilled to remove the unreacted o-xylene and the nitroxylenes. Distillation residue was a mixture of 5 isomeric dinitrotetramethylbiphenyls (24 g.).

EXAMPLE III

The reaction vessel was a 500 ml. 3-necked flask equipped with a mechanical stirrer, a thermometer and a dropping funnel. The flask containing one mole of hemimellitene was immersed into a −10° C. bath. Then, with stirring, 140 ml. 90% nitric acid was added dropwise, while the reaction temperature was maintained at 5±4° C. After the addition of the acid the reaction mixture was poured rapidly on a stirred mixture of ethanol-free ether and ice to quench the reaction. The products were extracted into the ether layer and were washed with a 10% solution of sodium hydroxide and water and dried with saturated sodium chloride solution. The ether was removed in a Rotavapor at room temperature. The residues were analyzed by gas chromatography (Table IV). According to this process 2-nitro-2′,3,3′,4,4′,5-hexamethylbiphenyl (IV in Table I) and 2-nitro-3-3′,4,4′,5,5′-hexamethylbiphenyls (V in Table I) were produced. These compounds were isolated by fractionation of the reaction mixture and fractional crystallization of the cut boiling at 130–170° C. 0.8 torr. The residue of the fractional distillation gave 2,2′-dinitro-3,3′,4,4′,5,5′-hexamethylbiphenyl (VI in Table I) from acetone.

TABLE IV

Product distribution from the reaction of nitric acid with hemimellitene at 5±4° C.

| | Percent |
|---|---|
| Hemimellitene | 28.1 |
| 4-nitrohemimellitene | 31.8 |
| 5-nitrohemimellitene | 8.5 |
| 4,6-dinitrohemimellitene | 1.5 |
| 4,5-dinitrohemimellitene | 0.6 |
| 2-nitro-2′,3,3′,4,4′,5-hexamethylbiphenyl | 8.2 |
| 2-nitro-3,3′,4,4′,5,5′-hexamethylbiphenyl | 5.0 |
| 2-nitro-4,5,6,x′,y′,z′-hexamethylbiphenyl | 0.9 |
| Dinitrohexamethylbiphenyls (3 peaks) | 0.6 |

EXAMPLE IV

At −20±°5 C. reaction temperature 28 ml. 90% nitric acid was added dropwise to 0.2 mole stirred o-diethylbenzene. After being stirred an additional 30 minutes at −18° C. the reaction was quenched and worked up as described in Example I. The product mixture was analyzed by gas chromatography (Table V). According to this process isomeric nitrotetraethylbiphenyls were produced. They were identified by mass spectrometric analysis of samples trapped out from the gas chromatograph.

TABLE V

Product distribution from the reaction of nitric acid with o-diethylbenzene at −20±5° C.

| | Percent |
|---|---|
| o-Diethylbenzene | 48.3 |
| Nitro-o-diethylbenzenes (2 isomers) | 40.3 |
| Probably triethyldiphenylethanes (3 peaks) | 0.3 |
| Nitrotetraethylbiphenyls (6 peaks) | 8.1 |
| Dinitrotetraethylbiphenyls (2 peaks) | 0.4 |

EXAMPLE V

At 2±5° C. reaction temperature 28 ml. 90% nitric acid was added dropwise to 0.2 mole stirred o-ethyltoluene. After being stirred an additional 10 minutes at 0° C. the reaction was quenched and worked up as described in Example I. The product mixture was analyzed by gas chromatography (Table VI). According to this process isomeric nitrodimethyldiethylbiphenyls were produced. They were identified by mass spectrometric analysis of samples trapped out from the gas chromatograph.

TABLE VI

Product distribution from the reaction of nitric acid with o-ethyltoluene at 2±5° C.

| | Percent |
|---|---|
| o-Ethyltoluene | 44.9 |
| Nitro-o-ethyltoluenes (3 peaks) | 42.8 |
| Nitrodimethyldiethylbiphenyls (4 partially resolved peaks) | 11.8 |

EXAMPLE VI

With mechanical stirring 232 ml. 90% nitric acid was introduced dropwise to a mixture of 100 ml. o-xylene and 100 ml. m-xylene at −13±2° C. The exothermic reaction was controlled by the rate of the acid introduction. After all the acid was added the mixture was stirred for an additional 15 minutes. Then the reaction was quenched and worked up as described in Example I. The product mixture (210 g.) according to gas chromatographic analysis contained 4 isomeric nitrotetramethylbiphenyls in 2.2, 2.1, 8.0 and 2.9% respectively. These distilled at 145–165° C. during fractionation of the reaction mixture at 0.1 torr. Fractional crystallization from ethanol and hexane gave pure 2 nitro-2′,4,4′,5-tetramethylbiphenyl (VIII in Table I) (6.1 g.) and small amounts of pure 2-nitro-2′,3,4,4′-tetramethylbiphenyl (VII in Table I).

EXAMPLE VII

With mechanical stirring 22 ml. 90% nitric acid was introduced dropwise to a mixture of 100 ml. o-xylene and 100 ml. m-xylene at −15±10° C. After all the acid was added 50 ml. concentrated sulfuric acid was introduced dropwise to the stirred and cooled solution, which was allowed slowly to come to 15° C. Since gas chromatographic analysis of a sample taken from the reaction mixture indicated that dinitration of the tretramethylbiphenyls was only about 80% complete, additional 25 ml. concentrated sulfuric acid and 30 ml. 90% nitric acid were introduced dropwise at 15±3° C. and the mixture stirred at that temperature for an hour. Then the reaction was quenched and worked up as described in Example I. The product mixture was distilled at 0.5 torr up to 130° C. still-head temperatures. Residue (71 g.) was composed of isomeric dinitrotetramethylbiphenyls. Fractional crystallization from methanol and acetic acid gave pure 2,3'-dinitro-4,4',5',6-tetramethylbiphenyl (IX in Table I) (1.4 g.) and 2,2'-dinitro-4,4',5,6'-tetramethylbiphenyl (X in Table I) (8.2 g.).

EXAMPLE VIII

With mechanical stirring 239 ml. of 90% nitric acid was introduced dropwise to a mixture of 100 ml. o-xylene and 117 ml. mesitylene at −2±1° C. After all the acid was added the mixture was stirred for an additional 20 minutes and then the reaction was quenched and worked up as described in Example I. Gas chromatographic analysis of the product mixture indicated the formation of two nitropentamethylbiphenyls and a nitrotetramethylbiphenyl in 0.7, 14.4 and 0.6% quantities, respectively. The major nitropentamethylbiphenyl was isolated after removing the lower boiling components of the reaction mixture at 0.1 torr. Recrystallization from methanol gave this product in analytical purity, identified as 3-nitro-2,3',4,4',6-pentamethylbiphenyl (XI in Table I) (14.6 g.).

EXAMPLE IX

With mechanical stirring 235 ml. 90% nitric acid was introduced dropwise to a mixture of 90 ml. o-xylene and 106 ml. mesitylene at −5±5° C. in 90 minutes. Then 70 ml. of concentrated sulfuric acid was dropwise added at +5±5° C. in 90 minutes and afterwards the stirred reaction mixture was allowed to come to room temperature and stirred at that temperature for 2 hours with occasional cooling. Reaction was then quenched and worked up as described in Example I. Volatile components were removed by distillation at 0.6 torr. Residue from methanol gave 23.6 g. crystals of 2,3'-dinitro-2',3,4,4',6'-pentamethylbiphenyl (XII in Table I) which required one more recrystallization from dioxane-methanol to reach the melting point of Table I. From the mother liquors of XII was obtained 46 g. glassy solid with dinitropentamethylbiphenyl isomers as the main components.

EXAMPLE X

With mechanical stirring 210 ml. 90% nitric acid was introduced dropwise to a mixture of 90 ml. o-xylene and 101 ml. hemimellitene at −5±2° C. in 130 minutes. The mixture was stirred at that temperature for an additional 40 minutes and then worked up as described in Example I. The product mixture was fractionated at 0.1–0.2 torr. The 172–183° C. cut (46.5 g.) was a mixture of isomeric nitropentamethylbiphenyls with some nitrotetramethylbiphenyls and nitrohexamethylbiphenyls, the products of homo-coupling. An eutectic mixture containing 77.3% of 2-nitro-2',3',4,4',5-pentamethylbiphenyl (XIII in Table I) was obtained by fractional crystallization. 2-nitro-2',3,3',4,4',5 hexamethylbiphenyl could also be isolated from the mixture.

EXAMPLE XI

With mechanical stirring 210 ml. 90% nitric acid was introduced dropwise to a mixture of 90 ml. o-xylene and 106 ml. pseudocumene at −8±7° C. and stirred for an additional 40 minutes at that temperature. Then the reaction was quenched and worked up as described in Example I. The product mixture was fractionated at 0.4 torr. The 163–180° C. cut yielded 2-nitro-2',4,4',5,5'-pentamethylbiphenyl (XV in Table I) (10.3 g.) and 2-nitro-2',3,4,4',5'-pentamethylbiphenyl (XIV in Table I) (2.1 g.) by fractional crystallizations from methanol and hexane.

EXAMPLE XII

With mechanical stirring 85 ml. 90% nitric acid was introduced dropwise to a mixture of 36 ml. o-xylene and 45 ml. prehnitene at −13±2° C. in 80 minutes and stirred an additional 20 minutes before quenching the reaction. The work-up procedure of Example I was followed. The product mixture was fractionated at 0.1 torr. The 171–180° C. cut (5.9 g.) solidified on cooling. Recrystallization from ethyl acetate-methanol, a 1:9 mixture, gave 3.5 g. of pure 2-nitro-3,3',4,4',5,6-hexamethylbiphenyl (XVI in Table I).

EXAMPLE XIII

With mechanical stirring 23 ml. 90% nitric acid was dropwise added to a mixture of 11.0 g. o-diethylbenzene and 9.8 g. mesitylene at −14±4° C. in 30 minutes. After additional stirring at −12±2° C. for 40 minutes the reaction was quenched and worked up as described in Example I. According to this process 2.55 g. 3-nitro-2,4,6-trimethyl-3',4'-diethylbiphenyl (XVII in Table I) was produced as revealed by combined gas chromatographic-mass spectrometric analysis. The compound was isolated from the product mixture in 83% purity by vacuum fractionation (B.P. 165–167° C. 0.7 torr).

What is claimed is:

1. A process for preparing nitro and dinitro substituted polyalkylbiphenyls of the formula:

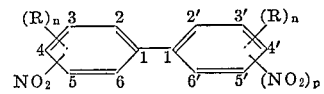

by adding nitric acid in a temperature of −35 to +30° C. to an ortho dialkylbenzene or ortho trialkylbenzene.

2. The process of claim 1 wherein the ortho dialkylbenzene treated with nitric acid is o-xylene and the reaction temperature is −10 to −25° C.

3. The process of claim 1 wherein the ortho trialkylbenzene treated with nitric acid is hemimellitene.

4. A process for preparing nitro and dinitro substituted polyalkylbiphenyls of the formula:

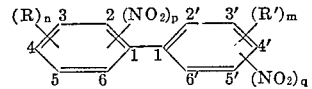

by adding nitric acid in a temperature of −35 to +30° C. to a 1:1 mixture of two polyalkylbenzenes, one component of which is an ortho dialkylbenzene or ortho trialkylbenzene.

5. The process of claim 4 wherein the two polyalkylbenzenes treated with nitric acid are o-xylene and m-xylene.

6. The process of claim 4 wherein the two polyalkylbenzenes treated with nitric acid are o-xylene and mesitylene.

7. The process of claim 4 wherein the two polyalkylbenzenes treated with nitric acid are o-xylene and hemimellitene.

8. The process of claim 4 wherein the two polyalkylbenzenes treated with nitric acid are o-xylene and pseudocumene.

9. The process of claim 4 wherein the two polyalkylbenzenes treated with nitric acid are o-xylene and prehnitene.

10. The process of claim 4 wherein the two polyalkylbenzenes treated with nitric acid are o-diethylbenzene and mesitylene.

References Cited

FOREIGN PATENTS 655,121  1/1963  Canada.

OTHER REFERENCES

Longo et al., Gazz. Chim. Ital., vol. 77, pp. 127 to 135 (1947).

Ward et al., J. Am. Chem. Soc., vol 54, p. 1697 (1932).

LELAND A. SEBASTIAN, Primary Examiner

U.S. Cl. X.R.

44—72; 424—349